Figure 1:
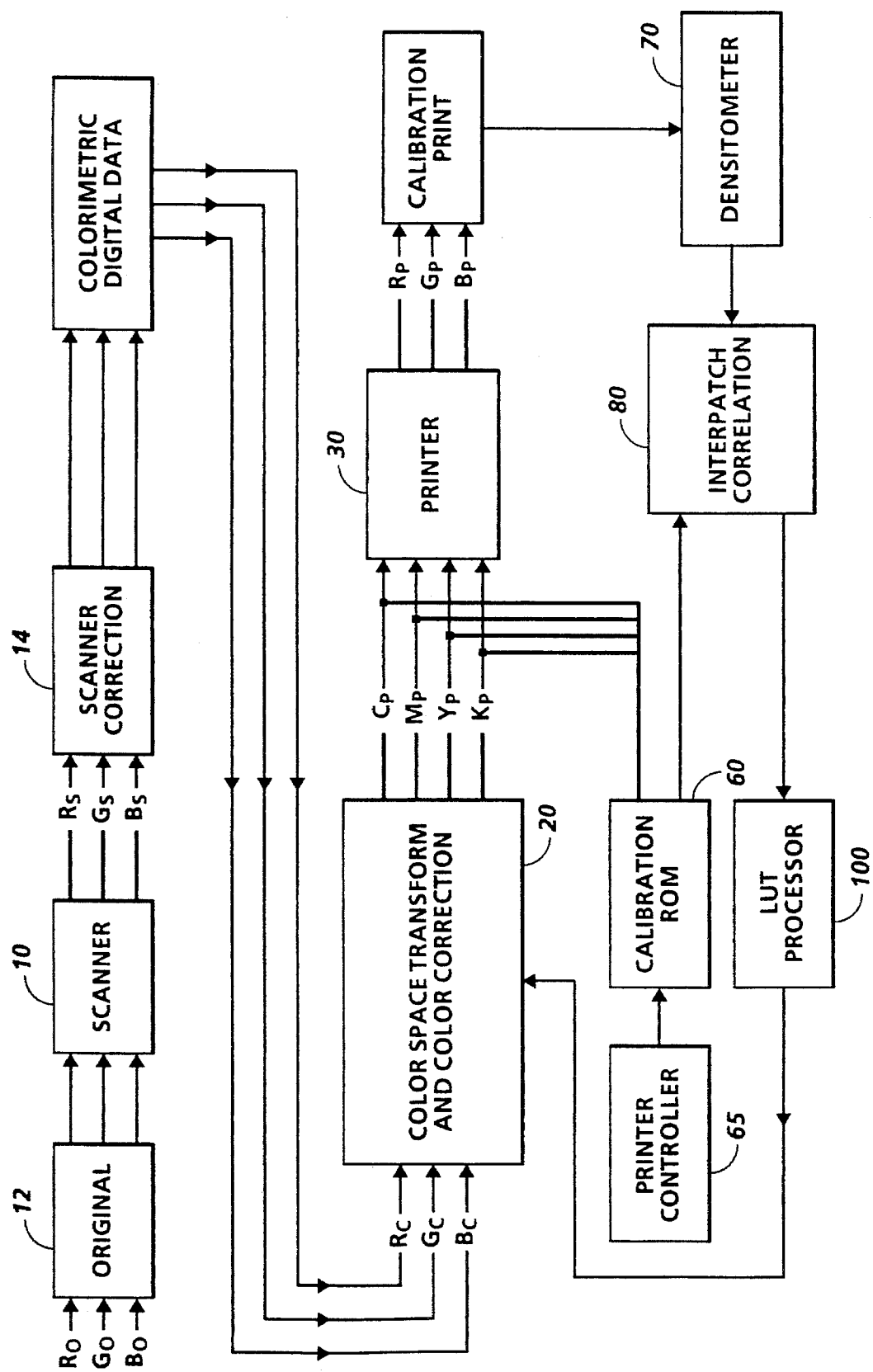

United States Patent [19]

Rolleston et al.

[11] Patent Number: 5,483,360
[45] Date of Patent: Jan. 9, 1996

[54] COLOR PRINTER CALIBRATION WITH BLENDED LOOK UP TABLES

[75] Inventors: Robert J. Rolleston, Penfield; Martin S. Maltz, Rochester, both of N.Y.

[73] Assignee: Xerox Corporation, Stamford, Conn.

[21] Appl. No.: 254,629

[22] Filed: Jun. 6, 1994

[51] Int. Cl.$^6$ .................................................... G03F 3/08
[52] U.S. Cl. ........................ 358/518; 358/523; 358/504; 358/501
[58] Field of Search ...................................... 358/500, 501, 358/504, 518, 520, 523, 524, 525, 400, 401, 447, 448

[56] References Cited

U.S. PATENT DOCUMENTS

| | | | |
|---|---|---|---|
| 2,790,844 | 4/1957 | Neugebauer | 178/5.2 |
| 4,275,413 | 6/1981 | Sakamoto et al. | 358/80 |
| 4,500,919 | 2/1985 | Schreiber | 358/78 |
| 5,305,119 | 4/1994 | Rolleston et al. | 358/522 |
| 5,331,439 | 7/1994 | Bachar | 358/524 |
| 5,381,246 | 1/1995 | Suzuki et al. | 358/523 |

OTHER PUBLICATIONS

Po–Chieh Hung, "Tetrahedral Division Technique Applied to Colorimetric Cabibration for Imaging Media", Annual Meeting IS&T, N.J., May 1992, pp. 419–422.

Po–Chieh Hung, "Colorimetric Calibration for Scanners and Media", SPIE, vol. 1448, Camera and Input Scanner System (1991).

Sigfredo I. Nin et al, "Printing CIELAB Images on a CMYK Printer Using Tri–Linear Interpolation", SPIE Proceedings, vol. 1670, 1992, pp. 316–324.

William J. Gordon et al, "Shepard's Method of 'Metric Interpolation' to Bivariate and Multivariate Interpolation", Mathematics of Computation, vol. 32, No. 141, Jan. 1978, pp. 253–264.

P. Lancaster et al, "Surfaces Generated by Moving Least Squares Methods"; Mathematics of Computation, vol. 32, No. 155, Jul. 1981, pp. 141–158.

P. Laihanen, "Colour Reproduction Theory Based on the Principles of Colour Science"; Advances in Printing Science & Technology, W. H. Banks ed, Pentech Press, London 1988, pp. 1–36.

P. Laihanen, "Optimization of Digital Color Reproduction on the Basis of Visual Assessment of Reproduced Images", Proceedings of the SID, vol. 30, No. 3, 1989, pp. 183–190.

D. Shepard, "A Two–Dimensional Interpolation Function for Irregularly–Spaced Data", Proceedings–1968 ACM National Conference, pp. 517–524.

Primary Examiner—Edward L. Coles, Sr.
Assistant Examiner—Thomas D. Lee
Attorney, Agent, or Firm—Mark Costello

[57] ABSTRACT

A color printer, responsive to printer signals to deposit printer colorants on a medium in accordance with printer signals received, is calibrated by operating the color printer with printer signals selected to cause the printer to print color samples on the medium; measuring the color samples to determine a first colorimetric response of the printer to the printer signals using the first measured colorimetric response to generate a first mapping of colorimetric values to printer signals; using the first measured colorimetric response or a subsequent measured colorimetric response to generate at least one additional mapping of colorimetric values to printer signals; storing the first and additional mappings in a color conversion memory producing printer signals as a function of the first and additional mappings stored in the color conversion memory to convert color definitions from a first color space to the printer signals suitable for producing a corresponding response at the color printer.

25 Claims, 3 Drawing Sheets

COLOR PRINTER CALIBRATION WITH BLENDED LOOK UP TABLES

FIELD OF THE INVENTION

The present invention is directed towards compiling look up tables representative of printer characteristics, to enable the conversion of colors defined in a first color space to colors defined in a printer color space, and more particularly to a method of blending or combining the characteristics represented by such tables.

CROSS REFERENCE

Cross reference is made to the following co-pending applications: U.S. Ser. No. 07/955,075, filed Oct. 1, 1992, entitled "Color Printer Calibration Architecture", by R. J. Rolleston et al. (assigned to the same assignee as the present application); U.S. Ser. No. 08/131,168, filed Oct. 4, 1993, entitled "Reduced Storage of Pre-Computed Difference Tables Used In Color Space Conversion", by R. J. Rolleston (assigned to the same assignee as the present application); U.S. Ser. No. 08/144,987, filed Oct. 29, 1993, entitled "Color Printer Calibration Test Pattern" by R. J. Rolleston et al. (assigned to the same assignee as the present application); U.S. Ser. No. 08/179,284, filed Jan. 10, 1994, entitled "Color Printer Calibration Architecture", by R. J. Rolleston et al. (assigned to the same assignee as the present application); and U.S. Ser. No. 08/223,494 filed Apr. 5, 1994, entitled, "Color Printer Calibration with Improved Color Mapping Linearity", by R. J. Rolleston, (assigned to the same assignee as the present application).

INCORPORATION BY REFERENCE

The following, patents are specifically incorporated by reference: U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system. The following articles are also hereby incorporated by reference: Po-Chieh Hung, "Tetrahedral Division Technique Applied to Colorimetric Calibration for Imaging Media ", Annual Meeting IS&T, NJ, May, 1992, pp. 419–422; and Sigfredo I. Nin, et al., "Printing CIELAB Images on a CMYK Printer Using Tri-Linear Interpolation", SPIE Proceedings, Vol. 1670, 1992, pp. 316–324; and William J. Gordon et al., "Shepard's Method of 'Metric Interpolation' applied to Bivariate and Multivariate Interpolation", Mathematics of Computation, Vol. 32, No. 141, January 1978, pp. 253–264 and P. Lancaster et al., "Surfaces Generated by Moving Least Squares Methods", Mathematics of Computation, Vol. 32, No. 155, July 1981, pp.141–158; and Pekka Laihanen, "Colour Reproduction Theory Based on the Principles of Colour Science", Advances in Printing Science and Technology, W. H. Banks ed., Pentech Press, London, 1988, pp. 1–36; and Pekka Laihanen, "Optimization of Digital Color Reproduction on the Basis of Visual Assessment of Reproduced Images", Proceedings of the SID, Vol 30. No. 3, 1989, pp. 183–190.

BACKGROUND OF THE INVENTION

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Scanner output is commonly transformed to a color space of tristimulus values, i.e., RGB (red-green-blue). Commonly, these values are a linear transformation of the standard XYZ coordinates of CIE color space, or a corrected transform of those values. In the case of computer generated images, colors defined by the user at the user interface of a workstation can be defined initially in color space of tristimulus values. These colors are defined independently of any particular device, and accordingly reference is made to the information as being "device independent".

Printers commonly have an output which can be defined as existing in a color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. These colors are defined for a particular device, and accordingly reference is made to the information as being "device dependent". Thus, while a printer receives information in a device independent color space, it must convert that information to print in a device dependent color space, which reflects the gamut or possible range of colors of the printer. Printers may print with colors beyond CMYK, for a variety of special purposes or to extend the device gamut.

The desirability of operating in a device independent color space with subsequent conversion to a device dependent color space is well known, as shown by U.S. Pat. No. 4,500,919 to Schreiber and U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of input values reflecting color samples throughout the printer gamut, the color samples are printed in normal operation of the printer. As previously noted, most printers have non-linear response characteristics.

In U.S. Pat. No. 4,275,413 to Sakamoto, the information derived is placed into look up tables, stored in a memory, perhaps ROM memory or RAM memory where the look up table relates input color space to output color space. The look up table is commonly a three dimensional table since color is defined with three variables. In RGB space, at a scanner or computer, space can be defined as three dimensional with black at the origin of a three dimensional coordinate system 0, 0, 0, and white at the maximum of a three dimensional coordinate system which an 8-bit system, would be located at 255, 255, 255. Each of the three axes radiating from the origin point therefore respectively define red, green, and blue. In the 8-bit system suggested, there will be, however, over 16 million possible colors ($256^3$). There are clearly too many values for a 1:1 mapping of RGB to CMY. Therefore, the look up tables consist of a set of values which could be said to be the intersections for corners of a set of cubes mounted on top of one another. Colors falling within each cubic volume can be interpolated from the measured values, through many methods including tri-linear interpolation, tetrahedral interpolation, polynomial interpolation, linear interpolation, and any other interpolation method depending on the desired accuracy of the result.

It would be very easy to index device dependent color values or specifications to device independent color specifications, but that is not the requirement. Instead, device independent specifications must be mapped to device dependent specifications. Several problems arise. Of course, the primary problem is that the printer response is not a linear response. A second problem is that the color space, and therefore the coordinates defined in the color space must be maintained as a uniform grid for maximum efficiency of some interpolation methods.

Accordingly, a multi-dimensional look up table (LUT) may be constructed which puts device independent input values into a predictable grid pattern. One method of accomplishing this requirement is by an interpolation process which derives a value at a desired location as a function of all (or a significant set) of measured color values. This method of interpolation is known as Shepard's Method (see, for example "Shepard's Method of 'Metric Interpolation' to Bivariate and Multivariate Interpolation" by W. Gordon and J. Wixom, Mathematics of Computation, Vol. 32, No. 141, January 1978, pp. 253–264). Shepard's Method suggests that a vector can be thought of as defining the difference between an asked-for color which was directed to a printer in the printed color. Then, for any other point in color space which is desired, that point can be thought of as a vector quantity, derived by averaging over the space all the vectors, each vector weighted by a function which decreases its effect on the vector as that vector is further and further away from the point coloring question. In one useful formula, each vector is weighted by a function of $1/d4$.

Alternatively the method of Po-Chieh Hung, "Colorimetric Calibration for Scanners and Media", SPIE, Vol. 1448, Camera and Input Scanner System, (1991), describes a method of inverse tetrahedral interpolation, to the same effect as the described Shepard's Method.

In one actual calibration test, it was noted that the weighted averaging technique produced a table which gave good color reproduction in one region of color space (the light colors), but not in another (the dark colors). The tetrahedral inversion technique was just the complement of this, i.e., it gave good color reproduction where the weighted average technique did not (the dark colors), and gave poorer color reproduction of colors where the weighted average technique gave good color reproduction (the light colors).

Similar to the above problem, it has been noted that often, after a change in process parameters due to time, change of materials, refilling toner, etc., a change in calibration is required only in a portion of the overall color gamut of a printer. Recalibration of the entire space is costly in terms of processing time. It would be desirable to only recalibrate a portion of the color space, or alternatively, to use the best portions of the color space mapping.

The references cited herein are incorporated by reference for their teachings.

SUMMARY OF THE INVENTION

In accordance with the invention there is provided a method generating a color space transform look up table derived from printer calibration measurements using separate table generations to produce the functionality of a single look up table.

In accordance with the invention, a color printer responsive to printer signals to deposit printer colorants on a medium in accordance with printer signals received, is calibrated by operating the color printer with printer signals selected to cause the printer to print color samples on the medium; measuring the color samples to determine a first colorimetric response of the printer to the printer signals using the first measured colorimetric response to generate a first mapping of colorimetric values to printer signals; using the first measured colorimetric response or a subsequent measured colorimetric response to generate at least one additional mapping of colorimetric values to printer signals; storing the first and additional mappings in a color conversion memory producing printer signals as a function of the first and additional mappings stored in the color conversion memory to convert color definitions from a first color space to the printer signals suitable for producing a corresponding response at the color.

In accordance with one aspect of the invention, the selected areas or portions of two (or more) look up tables mapping colorimetric values to color printer responses are blended. The output response for any colorimetric description from the blended tables is a linear combination of the output responses of the separate tables, where the linear function is adjusted as a function of position of the colorimetric description within colorimetic color space.

In accordance with another aspect of the invention, the second look up table may differ from the first look up table due to the creation method although using the same set of color samples, or the second look up table may differ from the first look up table due to using a different set of color samples.

Figure 2:
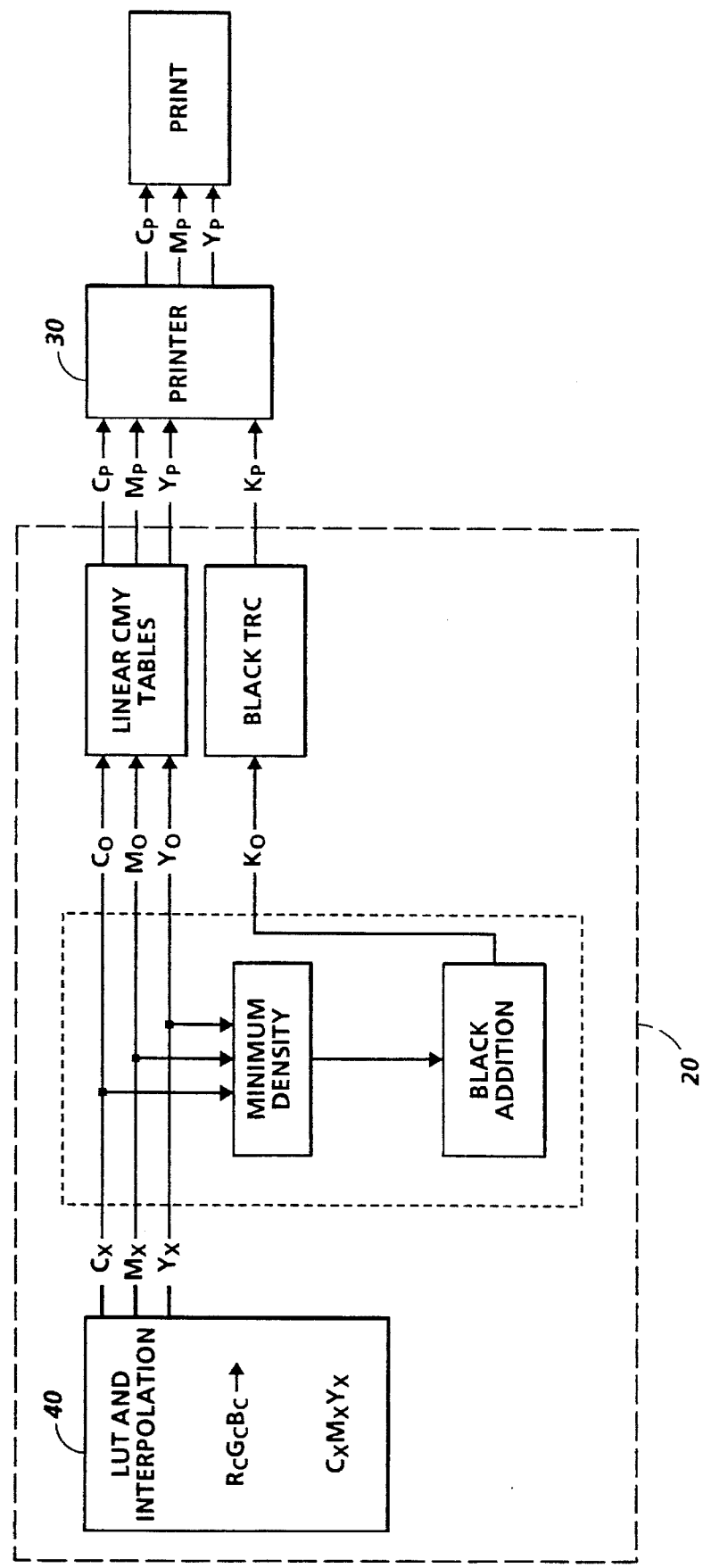
Figure 3:
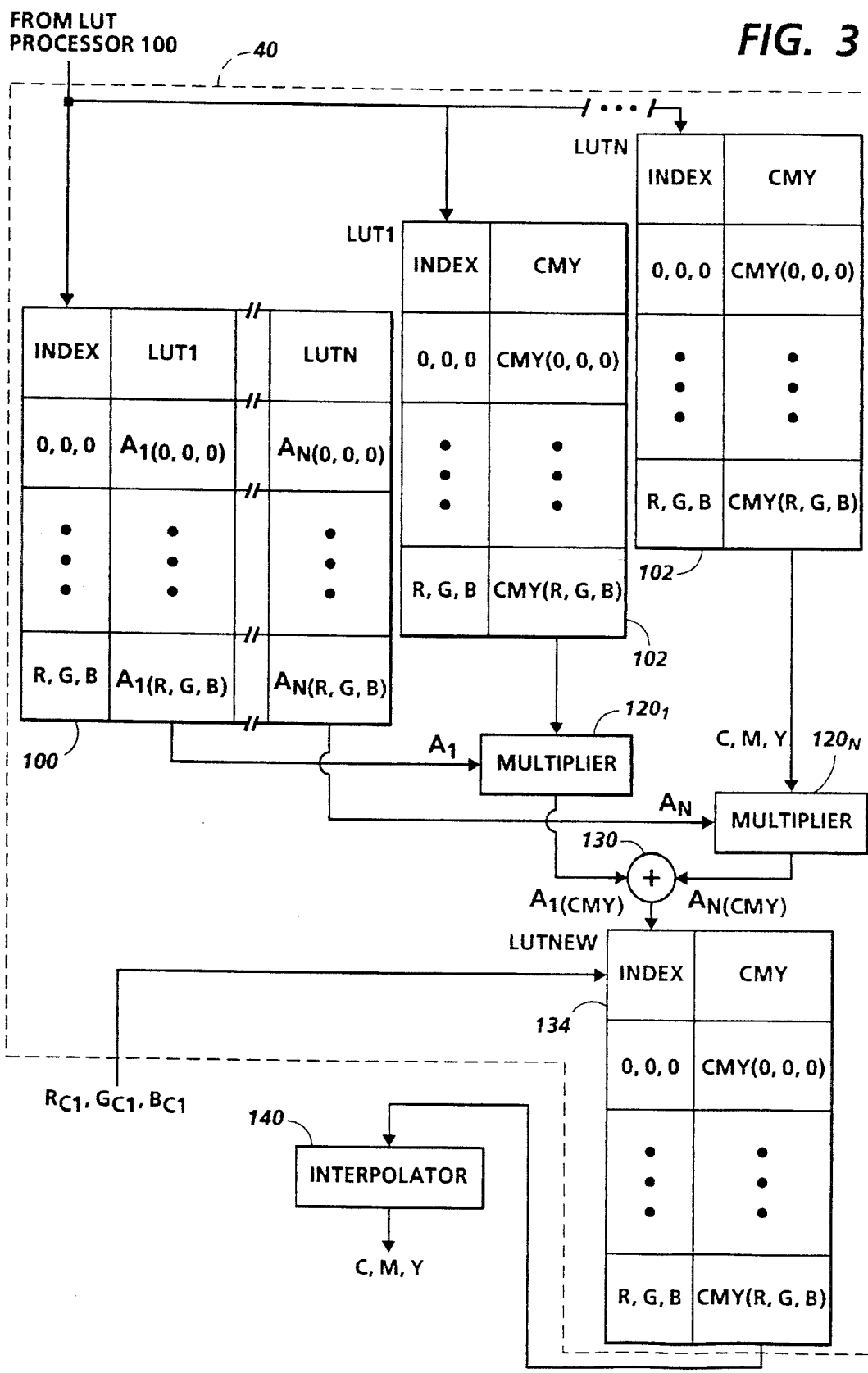

These and other aspects of the invention will become apparent from the following descriptions used to illustrate a preferred embodiment of the invention read in conjunction with the accompanying drawings in which:

FIGS. 1 and 2 together illustrate an overall system block diagram showing a color printing system in which the present invention might find use; and FIG. 3 illustrates the blended mapping described.

Referring now to the drawings where the showings are for the purpose of describing an embodiment of the invention and not for limiting same, a basic system for carrying out the present invention is shown in FIG. 1. In a system, a scanner 10, such as perhaps the color scanner available in the Xerox 5775 digital color copiers, which can be calibrated to produce a set of digital colorimetric or device independent data describing an original image 12, rendered in colors $R_O$, $G_O, B_O$, which, by definition, can be defined in terms of a colorimetric rgb space. Resulting from the scanning operation is a set of scanner image signals $R_s$, $G_s$, $B_s$, defined in device dependent scanner terms. Incorporated into the scanner or another processing path is a post-scanning processor 14, which provides correction of scanner image signals $R_s$, $G_s$, $B_s$ to colorimetric terms, $R_c$, $G_c$, $B_c$, typically digital in nature. The values may be in terms of CIE color space (rgb), or the L*a*b*, or luminance-chrominance space ($LC_1C_2$). A color space transform, indicated by block 20, such as that described in U.S. Pat. No. 4,275,413 to Sakamoto, is used to convert the device independent data to device dependent data. The output of color space transform 20 is the image defined in terms of a device dependent space, or printer colorant signals $C_p$, $M_p$, $Y_p$, $K_p$ that will be used to drive a printer 30. In one possible example, the colorant signals represent the relative amounts of cyan, magenta, yellow, and black toners to be deposited over a given area in an electrophotographic printer, such as, again, Xerox 5775 digital color copier. The printed output image may be said to be defined in terms of $R_p,G_p,B_p$, which are hoped to have a relationship with $R_o,G_o,B_o$ such that the printed output image has a color that is colorimetrically similar to the original image, although that similarity is ultimately dependent upon the gamut of the printing device.

With reference now to FIG. 2, and color space transformation and color correction 20, initially, $R_c$, $G_c$, $B_c$ color signals are directed to a lookup table and interpolation device 40, which provides a three dimensional look up arrangement in a device memory such as a RAM or other addressable memory device, which will meet speed and memory requirements for a particular device. Color signals $R_c$, $G_c$, $B_c$ are processed to generate address entries to a table therein which stores a set of transform coefficients with which the signals $R_c$, $G_c$, $B_c$ may be processed to convert them to $C_x$, $M_x$, $Y_x$ colorant signals or any multi-dimensional output color space including but not limited to CMYK or spectral data. Values which are not mapped may be determined through interpolation. As described in U.S. Pat. No. 5,305,119 by Rolleston, entitled "Color Printer Calibration Architecture", black addition for under color removal and gray balance processing may also be combined into the color space transform element. Although these features are not required, they are desirable and are illustrated herein. When we refer to colorimetric spaces, we are referring to spaces which are transforms of CIE XYZ space (1931). When we refer to device dependent space, we refer to a color space which is defined only in terms of operation of the device using it. While many color spaces have three dimensions, it is possible to have color spaces with less than three dimensions or more than three dimensions, and likewise, it is possible for printers to use less than three colorants or more than four colorants.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values.

To create the table, a set of color patches are created, preferably including determined linearization and black addition. This is done by printing and measuring about 1000 to 4000 patches of printer colors distributed throughout the color space, i.e., a large set of printer driving signals are generated, in varying densities of combinations of C,M,Y,K, or other printer colors and used to drive the printer. The color of each patch is measured, using a spectraphotometer to determine color in terms of $R_c,B_c,G_c$. The measured colors of these patches are used to build a multidimensional look up table (LUT) relating $R_c,B_c,G_c$ defined colors to $C_xM_xY_x$ defined colors. Conversions that do not include mapped and measured points may be interpolated or extrapolated. Reference is made to U.S. patent application Ser. No. 08/144, 987 to Rolleston entitled, "Color Printer Calibration Test Pattern", filed Oct. 29, 1993, which shows and describes a calibration test pattern for this purpose.

With reference again to FIG. 1, a calibration image is conveniently stored in a device memory such as calibration ROM 60, RAM, floppy or the like, or generated on the fly with a predetermined generation function. Signals stored therein are directed to the printer under the control of printer controller 65. Densitometer, spectraphotometer or colorimetrically corrected scanner 70 is used to scan the calibration target and produce $R_c$, $G_c$, $B_c$ signal values as a function of sensed density, representing the colors of each scanned patch. Interpatch correlation processor 80 reads the responses provided from densitometer 70 for each location in the calibration target and correlates the response with the input colorant signals, so that an $R_cG_cB_c$ to colorant mapping is generated.

The device independent values may be mapped to the device dependent space, perhaps in a manner described in U.S. Ser. No. 08/223,494 filed Apr. 5, 1994 entitled, "Color Printer Calibration with Improved Color Mapping Linearity". Alternatively the method of Po-Chieh Hung, "Colorimetric Calibration for Scanners and Media", SPIE, Vol. 1448, Camera and Input Scanner System, (1991), which describes a method of inverse tetrahedral interpolation, to the same effect as the described Shepard's Method.

With the look up table derived, it may be stored in LUT and interpolation 40, for use in converting device dependent values received from image creators to device independent printer signals.

In accordance with the invention, if for any reason a second set of mappings of colorimetric values to printer signals is generated, it immediately becomes apparent that one set may be better than the other set. More likely however, is that one set is better than the other set for only a portion of color space. Thus, a desire for optimum reproduction would require that both sets of data be used.

Accordingly, and with reference to FIG. 3, within LUT and Interpolation 40 are multiple look up tables, including a weight table 100, and look up tables LUT1 . . . LUTN, numbered 102. Conveniently, these tables are stored in RAM memory or the like. The tables are in a format that provides the colorimetic color description $R_C$, $G_C$, $B_C$ as an index or input value to each table. Coefficient table 100 has as outputs coefficients $A_1 \ldots A_N$. Each coefficient $A_1 \ldots A_N$ is derivable as a function of the position of the colorimetric color description in color space, and varies with the relative weight to be accorded to the LUT's relationship that region or portion of color space. In one embodiment, there is a set of coefficients $A_1 \ldots A_N$ corresponding to each table LUT1 . . . LUTN. Values are stored to coefficient table 100 and LUT1 . . . LUT from LUT processor 100. Coefficients stored to coefficient table 100 may also be operator or user generated and input to coefficient table 100 from a user interface.

LUT1 . . . LUTN are tables derived through the processes described above for the generation of first color space to second color space conversion. They are also in a format that provides the colorimetic color description $R_C$, $G_C$, $B_C$ as an index or input value to each table, but provide, for example, output CMYK signals. The signals are from LUT output respectively to multipliers $120_1 \ldots 120_N$ which have as a second input a corresponding coefficient A1 . . . AN from Table 100. The output of multipliers $120_1 \ldots 120_N$ is directed to an adder or accumulator 130 which actually adds the results together and directs its output to another area in memory, $LUT_{NEW}$ 134. From this area in memory, interpolator 140 can receive the stored information to produce its color conversion values. Interpolator 140, using for example trilinear or tetrahedral interpolation (as taught for example in U.S. Pat. No. 4,275,413 to Sakamoto) uses the stored LUT values to derive interpolated output values. (FIG. 3 shows block 40 from FIG. 1, labeled LUT AND INTERPOLATION, and therefore should include the tetrahedral or trilinear interpolation function, which is represented by interpolator 140.)

It can therefore be seen that the plural table blending function is characterized by $$LUT_{NEW}(r,g,b)=A1(r,g,b) \times LUT1(r,g,b)+A2(r,g,b) \times LUT2(r,g,b)+A3(r,g,b) \times LUT3(r,g,b)+ \ldots +AN(r,g,b) \times LUTN(r,g,b)$$

such that $$A1(r,g,b)+A2(r,g,b)+A3(r,g,b)+ \ldots +AN(r,g,b)=1$$

at each location in color space.

It is interesting to note that the case of only two tables, LUT1 and LUT 2 (which is expected to be a common case), can be addressed in a special manner, since if weight A1=A is accorded to LUT1, the weight A2 for LUT 2 is equal 1-A, and accordingly need not be stored independently. The special case of two LUT's can be addressed as:

$$LUT_{NEW}(r,g,b)=A(r,g,b)\times LUT1(r,g,b)+[1-A(r,g,b)]\times LUT2((r,g,b)$$

where LUT1() and LUT2() are the values of the first and second LUT's at some location (i.e. r, g, b) in the table, and A() is a function of the table location such that $0<=A<=1$. Of course, this result can be generalized to include N tables with N-1 weights.

In considering the function of position, it is useful to note that the function need not be a linear combination of LUT's. A particularly valuable function may represent use of only a single LUT at any point in space. Thus, within the area best characterized by LUT N, $A_{N=1}$, while all other LUT's have a value of A=0.

The embodiment described has been illustrated as generating a new LUT, named $LUT_{NEW}$. However, it is within the scope of the invention to generate blended values from LUT1 . . . LUTN on the fly, without storage or creation of a new LUT. Thus, the output of adder 130 would be directed immediately to interpolator 140, for each value of $R_C G_C B_C$ which is directed to coefficient table 100 and LUT table 102.

It is worth noting that the blending can be performed in any color space or coordinate system, and that the idea is not limited to using a linear combination of the preliminary LUTs. The novel aspect of this invention is the ability to combine several different LUTs into a single LUT. This technique has been reduced to practice, and in the example sighted above, the weights were set such that A=1 at R, G, B C,M,Y and W (i.e., all colors including white), and A=0 at K (black). Intermediate values of A were calculated by interpolation within this cube. LUT1 was the LUT which resulted from using a weighted average, and LUT2 was obtained by using tetrahedral inversion.

It will no doubt be appreciated that while we have shown the use of the invention in the conversion of a device independent color space to a device dependent color space, the invention applies equally as well to conversions to any transformation from a first space to a second space, irrespective of the nature of the space as device dependent or not.

It will no doubt be appreciated that the present invention can be accomplished through application software accomplishing the described functions, though a hardware circuit, which will probably provide optimum speed, or through some combination of software and hardware.

The invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. A method of calibrating a color printer, the color printer responsive to printer signals to deposit printer colorants on a medium in accordance with printer signals received, including the steps of:

operating the color printer with printer signals selected to cause the printer to print color samples on the medium;

measuring the color samples to determine a first colorimetric response of the printer to the printer signals;

using the first measured colorimetric response to generate a first mapping of colorimetric signals to printer signals;

using the first measured colorimetric response or a subsequent measured colorimetric response to generate at least one additional mapping of colorimetric values to printer signals;

storing the first and additional mappings in a color conversion memory;

producing printer signals as a function of a weighted combination of first and additional mappings stored in the color conversion memory to convert color signals from a first color space to the printer signals suitable for producing a corresponding response at the color printer, wherein at least two mappings contribute non-zero components to said printer signal.

2. A method as described in claim 1, wherein said colorimetric signals are red, green and blue signals.

3. A method as described in claim 1, wherein said printer signals correspond to printing cyan, magenta and yellow colorants.

4. A method as described in claim 1, wherein said printer signals correspond to printing cyan, magenta, yellow and black colorants.

5. A method as described in claim 1, wherein said printer signals correspond to printing cyan, magenta, yellow and at least one additional different non-black colorant.

6. A method as described in claim 1, wherein said printer signals correspond to printing cyan, magenta, yellow, black and at least one additional different colorant.

7. A method as described in claim 1, wherein the step of producing printer signals as a function of the first and additional mappings stored in the color conversion memory does so in accordance with the function:

$$C,M,Y=A1(r,g,b)\times LUT1(r,g,b)+A2(r,g,b)\times LUT2(r,g,b)+A3(r,g,b)\times LUT3(r,g,b)+ \ldots +AN(r,g,b)\times LUTN(r,g,b)$$

where C,M,Y is the printer signal produced as a function of the first and additional mappings stored in the color conversion memory, AN is a color space location dependent weight and LUTN(r,g,b) is the first and additional mappings of colorimetric values to printer signals.

8. The method as described in claim 7 wherein $$A1+A2+A3 \ldots +AN=1.$$

9. A color printer including a calibration system, the color printer responsive to printer signals directed thereto to deposit printer colorants on a medium in accordance with printer signals received, comprising:

means for generating printer signals selected to cause the printer to print color samples on the medium;

means for measuring a first colorimetric response of the printer to the printer signals from the color samples;

means for using the first measured colorimetric response to generate a mapping of colorimetric values to printer signals;

means for using the first measured colorimetric response or a subsequent measured colorimetric response to generate at least one additional mapping of colorimetric values to printer signals;

a color conversion memory;

printer control means for storing the first and additional mappings in the color conversion memory;

weighting means to producing printer signals as a function of the first and additional mappings stored in the color conversion memory, to convert color definitions from a first color space to printer signals suitable for producing a corresponding response at the color printer, wherein at least two mappings contribute non-zero components to said printer signal.

10. A device as described in claim 9, wherein said colorimetric signals are red, green and blue signals.

11. A device as described in claim 9, wherein said printer signals correspond to printing cyan, magenta and yellow colorants.

12. A device as described in claim 9, wherein said printer signals correspond to printing cyan, magenta, yellow and black colorants.

13. A device as described in claim 9, wherein said printer signals correspond to printing cyan, magenta, yellow and at least one additional different non-black colorant.

14. A device as described in claim 9, wherein said printer signals correspond to printing cyan, magenta, yellow, black and at least one additional different colorant.

15. A device as described in claim 9, wherein the step of producing printer signals as a function of the first and additional mappings stored in the color conversion memory does so in accordance with the function:

$$C,M,Y = A1(r,g,b) \times LUT1(r,g,b) + A2(r,g,b) \times LUT2(r,g,b) + A3(r,g,b) \times LUT3(r,g,b) + \ldots + AN(r,g,b) \times LUTN(r,g,b)$$

where C,M,Y is the printer signal produced as a function of the first and additional mappings stored in the color conversion memory, AN is a color space location dependent weight and LUTN(r,g,b) is the first and additional mappings of colorimetric values to printer signals.

16. A device as described in claim 15 wherein $$A1 + A2 + A3 \ldots + AN = 1.$$

17. A color printer including a calibration system, the color printer responsive to printer signals directed thereto to deposit printer colorants on a medium in accordance with printer signals received, comprising:

means for generating printer signals selected to cause the printer to print color samples on the medium;

means for measuring a first colorimetric response of the printer to the printer signals from the color samples;

means for using the first measured colorimetric response to generate a mapping of colorimetric values to printer signals;

means for using the first measured colorimetric response or a subsequent measured colorimetric response to generate at least one additional mapping of colorimetric values to printer signals;

a color conversion memory;

means for combining at least the first measured colorimetric response and any subsequent measured colorimetric response to produce a color conversion mapping, and storing said color conversion mapping in said color conversion memory;

weighting means to producing printer signals as a function of the first and additional mappings stored in the color conversion memory, to convert color definitions from a first color space to printer signals suitable for producing a corresponding response at the color printer, wherein at least two mappings contribute non-zero components to said printer signal.

18. A device as described in claim 17, wherein said colorimetric signals are red, green and blue signals.

19. A device as described in claim 17 wherein said printer signals correspond to printing cyan, magenta and yellow colorants.

20. A device as described in claim 17, wherein said printer signals correspond to printing cyan, magenta, yellow and black colorants.

21. A device as described in claim 17, wherein said printer signals correspond to printing cyan, magenta, yellow and at least one additional different non-black colorant.

22. A device as described in claim 17, wherein said printer signals correspond to printing cyan, magenta, yellow, black and at least one additional different colorant.

23. A device as described in claim 17, wherein the step of producing printer signals as a function of the first and additional mappings stored in the color conversion memory does so in accordance with the function:

$$C,M,Y = A1(r,g,b) \times LUT1(r,g,b) + A2(r,g,b) \times LUT2(r,g,b) + A3(r,g,b) \times LUT3(r,g,b) + \ldots + AN(r,g,b) \times LUTN(r,g,b)$$

where C,M,Y is the printer signal produced as a function of the first and additional mappings stored in the color conversion memory, AN is a color space location dependent weight and LUTN(r,g,b) is the first and additional mappings of colorimetric values to printer signals.

24. A device as described in claim 23 wherein $$A1 + A2 + A3 \ldots + AN = 1.$$

25. A method of calibrating a color printer responsive to printer signals to deposit printer colorants on a medium in accordance with printer signals received, including the steps of:

producing a calibration print as a printer response sample;

deriving a first mapping relating colorimetric values to printer response;

deriving at least one additional mapping relating colorimetric values to printer response;

generating a color conversion mapping as a weighted function of the first and additional mappings and storing said mapping in a color conversion memory, wherein at least two mappings contribute non-zero values to the color conversion;

operating the calibrated printer with the color conversion mapping to convert colorimetric values received to printer signals.

* * * * *